(12) United States Patent
Cabouillet et al.

(10) Patent No.: US 11,167,674 B2
(45) Date of Patent: Nov. 9, 2021

(54) SEAT ELEMENT PANEL

(71) Applicant: Faurecia Sieges D'Automobile, Nanterre (FR)

(72) Inventors: Anne-Sophie Cabouillet, Boissy-le-Sec (FR); Fabrice Etienne, Bavilliers (FR)

(73) Assignee: Faurecia Sieges D'Automobile, Nanterre (FR)

( * ) Notice: Subject to any disclaimer, the term of this patent is extended or adjusted under 35 U.S.C. 154(b) by 0 days.

(21) Appl. No.: 16/746,727

(22) Filed: Jan. 17, 2020

(65) Prior Publication Data
US 2020/0238866 A1 Jul. 30, 2020

(30) Foreign Application Priority Data
Jan. 25, 2019 (FR) ...................................... 19/00697

(51) Int. Cl.
  *B60N 2/56* (2006.01)
  *B60N 2/58* (2006.01)
  *F25B 21/02* (2006.01)

(52) U.S. Cl.
  CPC ......... *B60N 2/5685* (2013.01); *B60N 2/5692* (2013.01); *B60N 2/5891* (2013.01); *F25B 21/02* (2013.01)

(58) Field of Classification Search
  CPC ... B60N 2/5685; B60N 2/5691; B60N 2/5692
  USPC ............. 297/180.12, 452.14, 452.15, 452.65
  See application file for complete search history.

(56) References Cited

U.S. PATENT DOCUMENTS

| | | | | |
|---|---|---|---|---|
| 5,111,025 A | * | 5/1992 | Barma | A47C 7/748 219/217 |
| 5,915,783 A | * | 6/1999 | McDowell | A47C 7/748 297/180.12 |
| 6,119,463 A | * | 9/2000 | Bell | B60H 1/00471 62/3.7 |
| 6,220,659 B1 | * | 4/2001 | McDowell | A47C 1/12 297/180.12 X |
| 6,606,866 B2 | * | 8/2003 | Bell | B60H 1/00471 62/3.3 |
| 6,733,072 B2 | * | 5/2004 | Jaillet | B32B 5/18 297/180.12 |
| 6,907,739 B2 | * | 6/2005 | Bell | B60H 1/00471 62/3.3 |
| 7,178,344 B2 | * | 2/2007 | Bell | B60H 1/00471 62/3.7 |
| 7,250,586 B2 | * | 7/2007 | Diemer | H05B 3/146 219/217 |

(Continued)

FOREIGN PATENT DOCUMENTS

| | | | |
|---|---|---|---|
| CH | 668687 A | * 1/1989 | ............... A47C 7/74 |
| DE | 102012006073 A1 | 9/2013 | |

(Continued)

OTHER PUBLICATIONS

French Search Report issued in corresponding FR application No. 19/00697, dated Oct. 18, 2019, 2 pp.

*Primary Examiner* — Rodney B White
(74) *Attorney, Agent, or Firm* — Kaplan Breyer Schwarz, LLP

(57) ABSTRACT

A back panel of a motor vehicle seat element successively includes a layer of paint, a layer of non-expanded foam, at least one thermal device, and a layer of expanded foam.

20 Claims, 3 Drawing Sheets

(56) References Cited

U.S. PATENT DOCUMENTS

| | | | | |
|---|---|---|---|---|
| 7,977,608 B2* | 7/2011 | Diemer | ............... | B60N 2/002 |
| | | | | 219/217 |
| RE44,272 E * | 6/2013 | Bell | ............... | Y02B 30/00 |
| | | | | 62/3.7 |
| 9,172,023 B2* | 10/2015 | Bajic | ............... | H01L 35/32 |
| 9,420,640 B2* | 8/2016 | Li | ............... | H05B 3/34 |
| 9,989,282 B2* | 6/2018 | Makansi | ............... | H01C 1/16 |
| 2007/0210074 A1* | 9/2007 | Maurer | ............... | B60N 2/5685 |
| | | | | 219/549 |
| 2009/0134676 A1* | 5/2009 | Trimbakrao | ............... | B60N 2/58 |
| | | | | 297/180.12 |
| 2011/0290785 A1* | 12/2011 | Schaeffer | ............... | B60N 2/5685 |
| | | | | 219/538 |
| 2013/0249258 A1* | 9/2013 | Kortwig | ............... | B60N 2/5685 |
| | | | | 297/180.12 |
| 2015/0003493 A1* | 1/2015 | Bieck | ............... | B60N 2/5685 |
| | | | | 374/51 |
| 2016/0039321 A1* | 2/2016 | Dacosta-Mallet | ... | B60N 2/5685 |
| | | | | 219/202 X |
| 2019/0061576 A1* | 2/2019 | Tait | ............... | B60N 2/5678 |
| 2020/0137838 A1* | 4/2020 | Wada | ............... | B60N 2/5685 |

FOREIGN PATENT DOCUMENTS

| | | |
|---|---|---|
| DE | 102013011058 A1 | 4/2014 |
| EP | 1714584 A1 | 10/2006 |
| JP | 4158808 A | 6/1992 |

* cited by examiner

SEAT ELEMENT PANEL

This application claims the priority benefit of French patent application number 19/00697, the content of which is hereby incorporated by reference in its entirety to the maximum extent allowable by law.

FIELD

The present disclosure generally concerns motor vehicle seats and, more specifically, the back panels of seat elements.

BACKGROUND

Thermal heating and/or cooling elements are more and more often integrated to motor vehicle seats.

SUMMARY

An embodiment overcomes all or part of the disadvantages of known techniques of integration of thermal elements to the back panels of seat elements.

An embodiment provides a back panel of a motor vehicle seat element successively comprising a layer of paint, a layer of non-expanded foam, at least one thermal device, and a layer of expanded foam.

According to an embodiment, the thermal device comprises at least one heating thermal element.

According to an embodiment, the thermal device comprises at least one cooling thermal element.

According to an embodiment, the thermal device comprises thermal paint.

According to an embodiment, the thermal device comprises a thermal film.

According to an embodiment, the thermal device comprises at least one thermal element formed by printing.

According to an embodiment, the thermal device comprises at least one Peltier-effect element.

According to an embodiment, the thermal device is a thermal fabric.

According to an embodiment, said panel comprises on its outer surface a varnish layer.

According to an embodiment, said panel is a panel for regulating the temperature of spaces located in second and in third rows respectively equipping seats of first and second rows.

An embodiment provides a method of forming a back panel of a motor vehicle seat element comprising at least the successive steps of:
depositing a layer of paint;
depositing, on the paint layer, a layer of non-expanded foam;
depositing, on the layer of non-expanded foam, at least one thermal device;
depositing, on the layer of non-expanded foam and/or on the thermal element(s), a layer of expanded foam.

According to an embodiment, the thermal device is selected among the devices described in the previous disclosure.

According to an embodiment, the method further comprises a step of deposition of an outer varnish layer.

The foregoing and other features and advantages will be discussed in detail in the following non-limiting description of specific embodiments in connection with the accompanying drawings.

DETAILED DESCRIPTION

Figure 1:
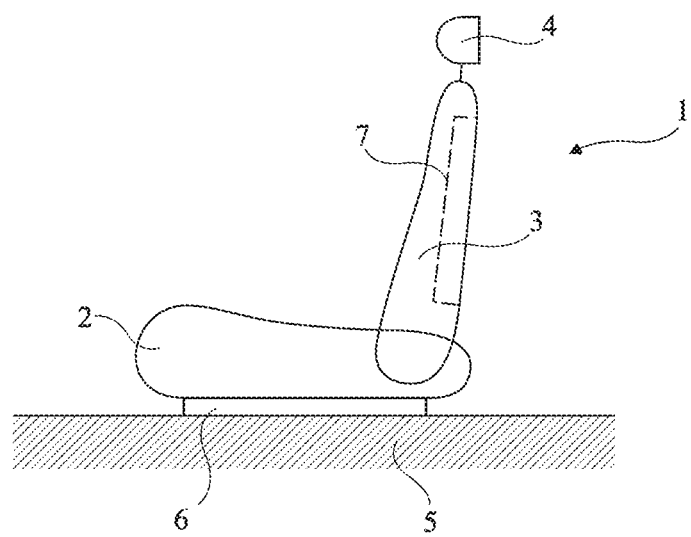
FIG. 1 is a simplified lateral view of a motor vehicle seat.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, usual seat elements which are not necessary to the understanding, such as the frame, have not been detailed.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more other elements.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., it is referred to the orientation of the drawings or to a seat in a normal position of use.

The terms "about", "approximately", "substantially", and "in the order of" are used herein to designate a tolerance of plus or minus 10%, preferably of plus or minus 5%, of the value in question.

FIG. 1 is a simplified lateral view of a motor vehicle seat. Such a seat 1 comprises a seat bottom piece 2 having a backrest 3 jointed thereto, most often topped with a headrest 4. The assembly may be reinforced by a frame, generally made of metal. The seat bottom piece may be connected to floor 5 of the vehicle by a slide rail mechanism 6. Seat 1 may also comprise one or a plurality of armrests (not shown).

Seat bottom piece 2, backrest 3, and headrest 4 each comprise, on a first surface, or front side, in contact with the user, upholstery.

Backrest 3 comprises on its second surface, or back side, a back panel 7. Panel 7 is a piece different from the upholstery, fastened to the back of backrest 3 of seat 1. The fastening is for example obtained by clips or by slide fasteners, on the frame or on the upholstery.

Reference will be made hereafter to the back panel of the backrest. However, unless otherwise specified, all that will be described hereafter more generally applies to any seat element for which the same problems are posed, for example, a back panel of a headrest.

Figure 2:
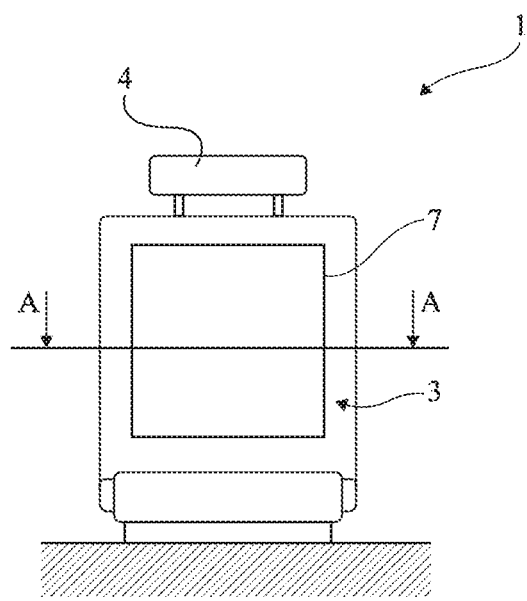
FIG. 2 is a simplified back view of an embodiment of a motor vehicle seat element.

FIG. 2 is a simplified back view of an embodiment of motor vehicle seat element.

Panel 7 is here shown with a rectangular shape, but any other shape, for example, circular, triangular, etc. is appropriate.

Figure 3:
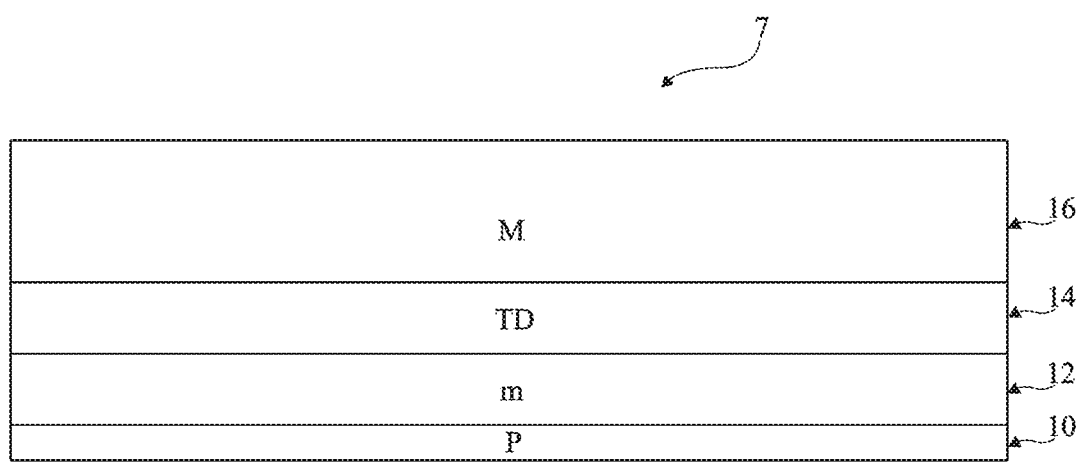
FIG. 3 shows a simplified cross-section view of an embodiment of a back panel of a seat element.

FIG. 3 shows a cross-section view of an embodiment of a back panel of a seat element.

FIG. 3 is a cross-section view of back panel 7 taken along line A-A of FIG. 2, which is a horizontal cross-section line crossing backrest 3 through back panel 7.

Panel 7 is formed of the stacking of a layer 10 of paint P, of a layer 12 of non-expanded foam m, of at least one thermal device TD (illustrated by a layer 14), and of a layer 16 of expanded foam M. For example, the layers have the same surface areas.

The formulations of the non-expanded and expanded foams, m and M, are selected so that after the polymerization, expanded foam M has a lower density than non-expanded foam m. The chemical products thus used in the composition of expanded foam M are selected to obtain a polymerization reaction generating open cells, that is, cavities filled with air. Thereby, foam m contains less voids or air cells than foam M.

In practice, during a deposition by spraying, air bubbles are trapped in the foam. If air is thus intrinsically present in foam m after the polymerization, it is in a parasitic or negligible quantity as compared with the quantity of air present in foam M. Layer 12 of non-expanded foam m is preferably as thin as possible, enabling thermal device TD to be at closest to the rear surface of panel 7 and thus to improve the thermal performance of panel 7.

Panel 7 may be covered on its outer surface with a varnish layer.

The embodiment illustrated in FIG. 3 for example comprises a thermal device forming a layer 14 of same surface area as the other layers of the panel.

According to an embodiment, thermal device TD may have a surface area smaller than that of layers 10, 12, and 16 and/or only be present in certain areas of the panel.

Thermal device TD is heating and/or cooling.

Thermal device TD enables panel 7 to regulate the temperature of spaces located in second and in the third rows respectively equipping seats of first and of second rows.

Thermal device TD comprises at least one thermal element. The thermal element of the device is for example thermal paint, a thermal film, an element formed by printing, a Peltier-effect element, or a resistive conductive wire. In the case of Peltier-effect elements or conductive wires, a same device preferably comprises a plurality of elements distributed in the surface of the device.

According to a specific embodiment, the device is a heating fabric where resistive conductive wires are linked to the weft of the fabric.

The thermal device may comprise a combination of different thermal elements.

Figure 4:
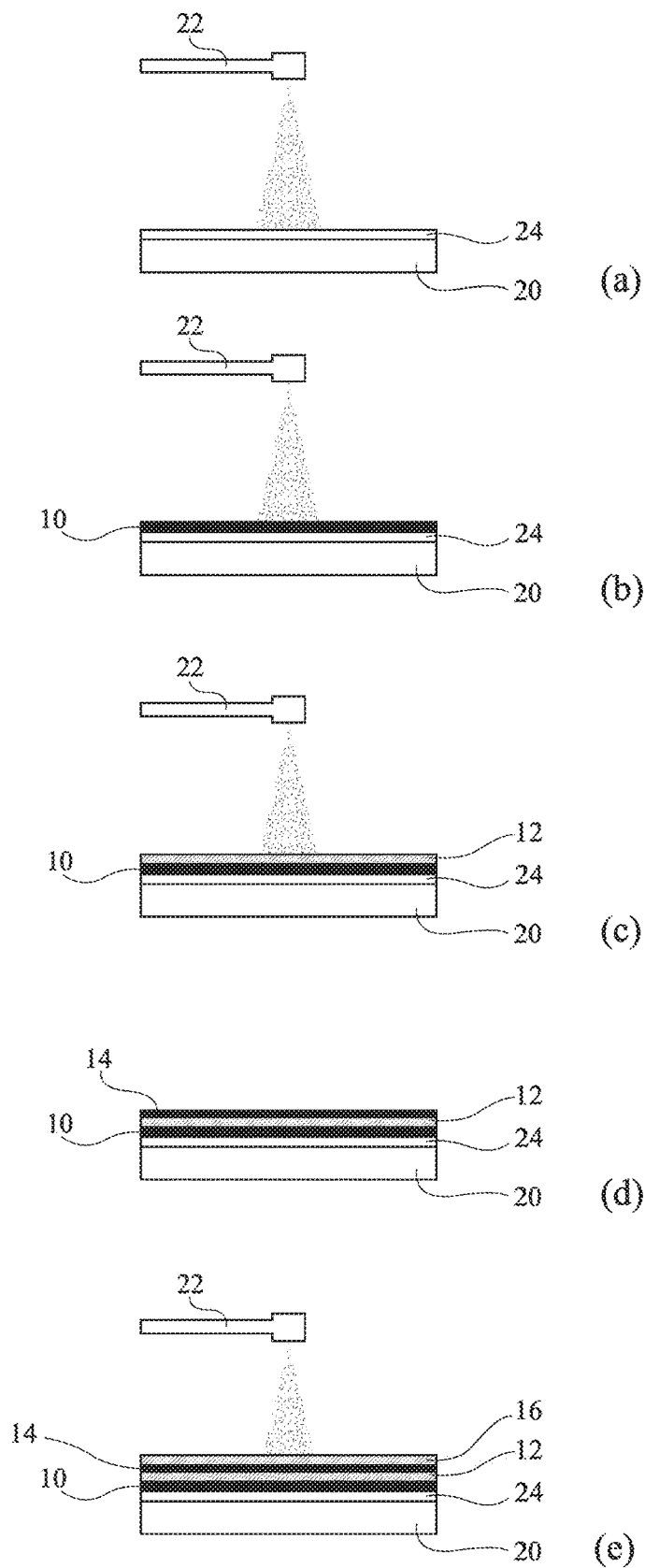
FIG. 4 shows, in views (a) to (e), cross-sections illustrating steps of embodiments of a method of forming a back panel of a seat.

FIG. 4 shows, in views (a) to (e), cross-section views illustrating steps of embodiments of a method of manufacturing a back panel of a seat.

A mold 20 having the shape of the back side, or outer surface, of the panel 7 to be formed, is used. This surface preferably forms the visible surface of the back panel. Unless otherwise specified, the deposition of the different layers is performed by spraying by means of a nozzle 22.

In a first step, shown in FIG. 4(a), a layer 24 of a release agent is deposited in mold 20.

If desired, a varnish layer (not shown) may then be deposited on layer 24 of release agent.

In a second step, shown in FIG. 4(b), a layer 10 of paint is deposited. The latter is deposited on layer 24 of release agent or the varnish layer according to the embodiment.

In a third step, shown in FIG. 4(c), a layer 12 of non-expanded foam is deposited on layer 10 of paint.

In a fourth step, shown in FIG. 4(d), at least one thermal device is deposited on layer 12 of non-expanded foam.

The deposited thermal device may be of any type. In particular, all the above-described examples of thermal devices are appropriate.

The deposition of the selected thermal device is typically performed by application, except for the thermal paint, which may be deposited by spraying. To show that any type of deposition is possible, nozzle 22 is not shown in FIG. 4(d).

The thermal device is schematically shown in FIGS. 4(d) and 4(e) by a layer 14, having the same surface area as layers 24 and 10 of the panel. This layer is representative of specific embodiments using a thermal device exclusively made of thermal paint, of a thermal film, or of a heating fabric.

According to another example, the thermal device may have a surface area smaller than that of layers 10, 12, and 16 and/or only be present in certain areas of the panel.

In a fifth step, shown in FIG. 4(e), a layer 16 of expanded foam is deposited on one of or the thermal devices and/or on layer 12 of non-expanded foam.

Various embodiments and variations have been described. It will be understood by those skilled in the art that certain features of these various embodiments and variations may be combined, and other variations will occur to those skilled in the art. In particular, the selection of the compositions of the used foams according to the desired characteristics is within the abilities of those skilled in the art.

Finally, the practical implementation of the described embodiments and variations is within the abilities of those skilled in the art based on the functional indications given hereabove. In particular, the selection of the thermal device(s), particularly of its components, as well as the selection of its (their) area(s) of application to obtain a desired thermal performance, depends on the application.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A back panel of a motor vehicle seat element successively including a layer of expanded foam, at least one thermal device disposed over the layer of expanded foam, a layer of non-expanded foam disposed over the at least one thermal device, and a layer of paint disposed over the layer of non-expanded foam.

2. The back panel of claim 1, wherein the thermal device comprises at least one heating thermal element.

3. The back panel of claim 1, wherein the thermal device comprises at least one cooling thermal element.

4. The back panel of claim 1, wherein the thermal device comprises thermal paint.

5. The back panel of claim 1, wherein the thermal device comprises a thermal film.

6. The back panel of claim 1, wherein the thermal device comprises at least one thermal element formed by printing.

7. The back panel of claim 1, wherein the thermal device comprises at least one Peltier-effect element.

8. The back panel of claim 1, wherein the thermal device is a thermal fabric.

9. The back panel of claim 1, wherein said panel comprises at its outer surface a varnish layer.

10. The back panel of claim 1, wherein said panel is a panel for regulating the temperature of spaces located in second and third rows respectively equipping seats of first and second rows.

11. A back panel of a motor vehicle seat element successively including a layer of expanded foam, at least one thermal device disposed on the layer of expanded foam, a layer of non-expanded foam disposed on the at least one thermal device, and a layer of paint disposed on the layer of non-expanded foam.

12. The back panel of claim 11, wherein the thermal device comprises at least one heating thermal element.

13. The back panel of claim 11, wherein the thermal device comprises at least one cooling thermal element.

14. The back panel of claim 11, wherein the thermal device comprises thermal paint.

15. The back panel of claim 11, wherein the thermal device comprises a thermal film.

16. The back panel of claim 11, wherein the thermal device comprises at least one thermal element formed by printing.

17. The back panel of claim 11, wherein the thermal device comprises at least one Peltier-effect element.

18. The back panel of claim 11, wherein the thermal device is a thermal fabric.

19. The back panel of claim 11, wherein said panel comprises at its outer surface a varnish layer.

20. The back panel of claim 11, wherein said panel is a panel for regulating the temperature of spaces located in second and third rows respectively equipping seats of first and second rows.

* * * * *